June 2, 1970  J. L. CONNER  3,515,410
TOW BAR WITH SHEAR MOUNT
Filed April 16, 1966
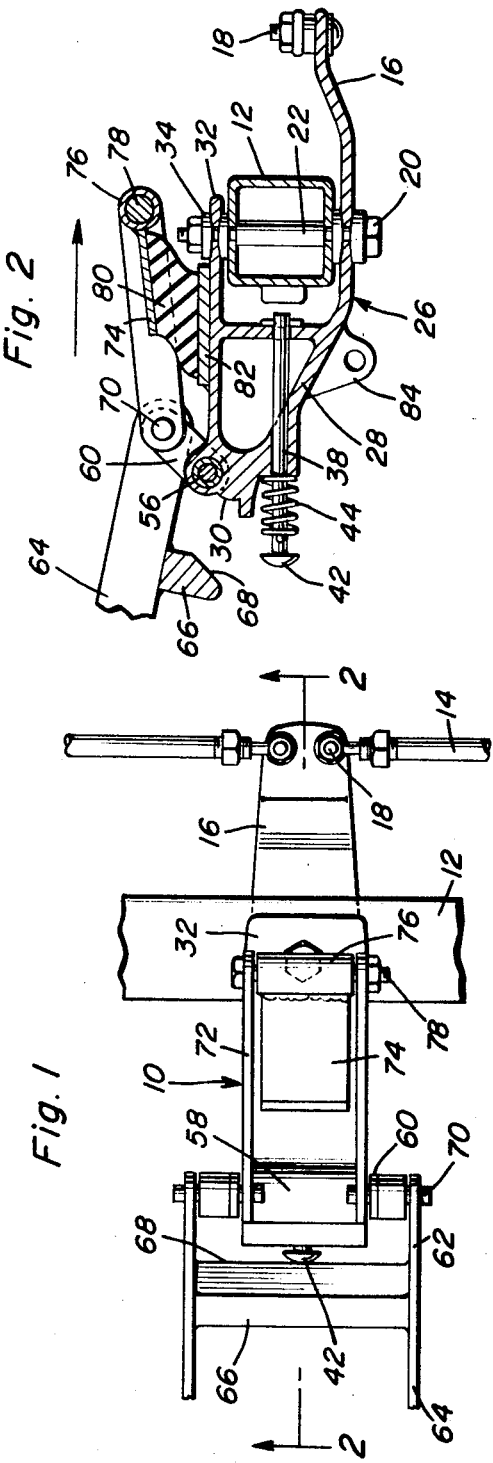
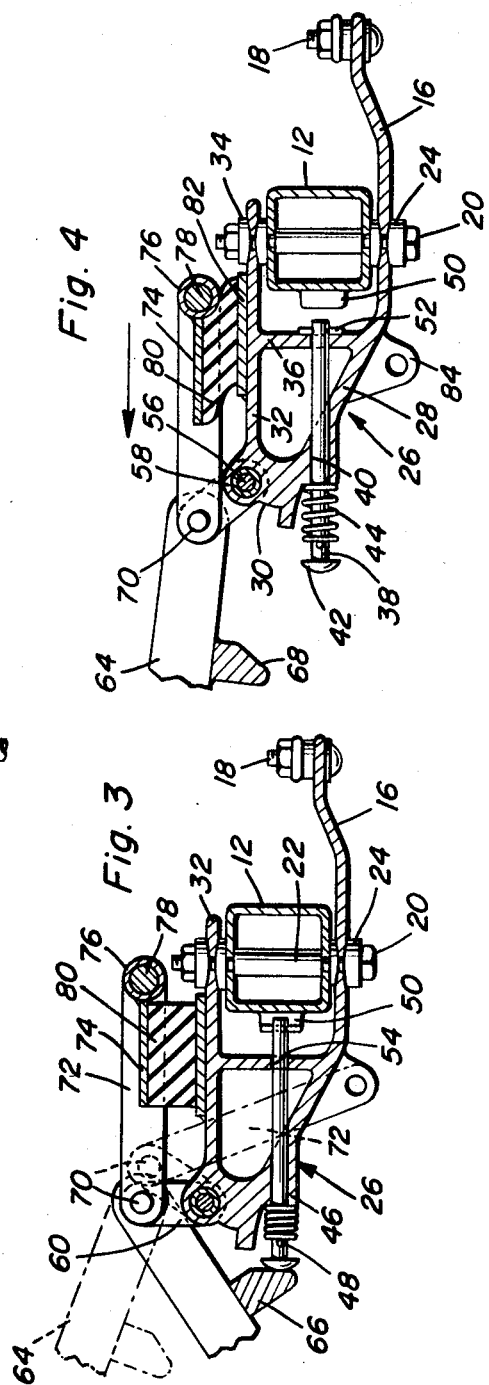
James Leon Conner
INVENTOR.
BY Clarence A. O'Brien
and Harvey B. Jacobson
Attorneys United States Patent Office 3,515,410
Patented June 2, 1970

3,515,410
TOW BAR WITH SHEAR MOUNT
James Leon Conner, Silver Spring, Md., assignor to Gichner Mobile Systems, Inc., a corporation of Maryland
Filed Apr. 16, 1968, Ser. No. 721,815
Int. Cl. B62d 13/04
U.S. Cl. 280—445                           8 Claims

ABSTRACT OF THE DISCLOSURE

A tow bar for interconnecting a towing and towed vehicle incorporating a block or body of resilient material disposed in a manner so that the shear resistance of such a block serves to transmit the forces between the vehicles.

---

The present invention generally relates to a tow bar for articulate interconnection of a towing vehicle and a towed vehicle with a shear block disposed therein for transmitting the forces and absorbing shock forces. The present invention represents certain improvements on the tow bar construction illustrated in copending application Ser. No. 463,510, filed June 14, 1965 by George M. Fulmer for Hydraulically Operated Demountable Running Gear With Diagonal Rams, assigned to the same assignee and now Pat. No. 3,378,276.

In the aforementioned copending application, there is disclosed a demountable running gear for a load carrying body with the front running gear having a tow bar connected thereto for connection with a towing vehicle. When the tow bar is disconnected from the towing vehicle and is disposed in a downwardly inclined position or a normal position when the tow bar is unsupported by the towing vehicle, the steerable wheels on the front running gear are locked to prevent pivotal movement of such steerable wheels.

The present invention has for one of its objects the provision of a rubber shear block incorporated into the tow bar construction in such a manner that forces transmitted between the towing vehicle and the towed vehicle or running gear will be cushioned.

A further object of the invention is to provide a shear mounting for the tow bar incorporating a linkage system in which the linkage system combines with the shear mount to enable a varying proportion of the forces transmitted between the vehicles to be directly transmitted in which initial forces transmitted are transmitted substantially completely through the shear mount and when large forces are transmitted so that the shear mount is deformed to its maximum, a substantially larger proportion of the forces are transmitted directly between the vehicles through the linkage system thus reducing incidents of complete rupture of the shear mount.

Still another object of the invention is to provide a tow bar with a shear mount incorporated therein together with a linkage system which may be positioned in one condition for transmitting forces through the shear mount and positioned in another position for direct transmission of all forces between the vehicles so that even in the event of rupture of the shear mount, the tow bar will effectively transmit such forces by merely reorienting a portion of the linkage system.

Still another important object of the present invention is to provide a tow bar with a shear mount incorporated therein which also includes structural features to lock the tow bar and correspondingly lock the front steerable wheels of the towed vehicle when the tow bar is disconnected from a towing vehicle and disposed in a downwardly extending position such as would be caused by gravity when the free end of the tow bar is unsupported by a towing vehicle.

A still further significant feature of the present invention is to provide a tow bar with a shear mount incorporated therein which is relatively simple in construction, easy to assemble, easy to replace components and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmental top plan view of a demountable running gear with the tow bar with a shear mount incorporated therein;

FIG. 2 is a longitudinal, sectional view taken substantially upon a plane passing along section line 2—2 of FIG. 1 illustrating the tow bar and shear mount in a relaxed condition with the tow bar disposed in downwardly inclined position for locking the tow bar and front steerable wheels from pivotal movement about a vertical axis and also illustrating, in dotted line, the orientation of the safety link in the event of rupture of the shear mount;

FIG. 3 is a sectional view similar to FIG. 2 but illustrating the tow bar exerting a pulling force upon the shear mount illustrating the relationship of components; and FIG. 4 is a sectional view similar to FIG. 3 but illustrating the tow bar and shear mount exerting a pushing force against the towed vehicle.

Referring now specifically to the drawings, the tow bar with a shear mount incorporated therein is generally designated by the numeral 10 and is illustrated in association with the front axle 12 of a demountable running gear assembly such as that illustrated in the aforementioned copending application. However, it is pointed out that the tow bow and shear mount 10 may be incorporated into various types of structures for transmitting towing or pushing forces from one vehicle to another. In the assembly illustrated, the axle 12 is rigid and extends transversely and is provided with steerable wheels at the outer ends thereof which are controlled by a pair of tie rods or drag links 14 that have their respective outer ends attached to a steering arm operatively connected with the steerable wheels for pivotal movement of the steerable wheels about vertical axes defined by the kingpins which attach the steerable wheels to the outer ends of the axle 12. This structure is all disclosed in the aforementioned copending application.

The inner ends of the drag links 14 are attached to a rearwardly extending arm 16 by fastener assemblies 18 thus pivotally connecting the drag links 14 to the arm 16. The arm 16 extends forwardly under the axle 12 and is pivotally supported therefrom by a pivot bolt or pin 20 which extends through a sleeve 22 disposed within the hollow axle 12 and bearing adapters 24 are provided for journaling the arm 16 from the axle 12 for pivotal movement about a vertical axis formed by the bolt or pin 20.

The arm 16 extends forwardly of the axle 12 and is unitary with an adapter or bracket structure generally designated by numeral 26 and which includes a lower plate 28 which extends forwardly and upwardly from the forward end of the arm 16. The forward end of the plate 28 terminates in an apex 30 with a top plate 32 extending rearwardly from the apex 30 into overlying relation to the axle 12 with the rear end of the plate 32 also being mounted on the pivot bolt or pin 20 with bearing adapters 34 being provided thereon similar to the bearing adapters 24 thus journaling the adapter or bracket 26 from the axle 12. A vertically disposed reinforcing plate or gusset 36 is provided between the lower plate 28 and the upper plate 32 for rigidifying the adapter or bracket 26.

Slidably mounted on the adapter 26 is an elongated locking rod or pin 38 reciprocally mounted in a horizontally and forwardly extending and opening bore 40 in the wall 28. The lockpin 38 includes an enlarged rounded head 42 and a coil spring 44 encircles the rod 38 inwardly of the head 42. One end of the spring 44 abuttingly engages a boss 46 formed on the lower plate 28 in which the bore 40 is formed. The forward end of the spring 44 engages a transverse pin 48 so that the spring 44 normally biases the lockpin 38 forwardly into disengaged relation to a pair of spaced lugs 50 fixed to the forward surface of the axle 12. When the lockpin 38 is forced rearwardly, it engages between the lugs 50, see FIG. 2, and locks the adapter 26 from pivotal movement about the vertical axis defined by the bolt 20.

The lockpin 38 is provided with a transverse pin or pins 52 thereon which limit the forward movement of the lockpin 38 through the aperture 54 in the vertical plate 36 thus retaining the lockpin 38 in normally released position from the lugs 50 with the inner end of the lockpin engaging the lugs 50 when the lockpin 38 is forced rearwardly.

The apex 30 of the adapter or bracket 26 is provided with a pivot pin or bolt 56 extending through a transverse bore formed in a generally cylindrical boss 58 with a suitable bearing or bushing provided for the pivot pin or bolt 56. A pair of links 60 are attached to the outer ends of the pin or bolt 56 and extend upwardly therefrom. The upper ends of the links 60 are pivotally connected to a pair of ears or plates 62 formed integrally with the rear end of a tongue or tow bar 64. Extending transversely of and depending below the tow bar or tongue 64, there is provided a transverse abutment member 66 having a rearwardly facing inclined abutment surface 68 thereon for engaging the rounded head 42 on the lockpin 38 when the tow bar 64 is pivoted downwardly about the pivot pins 70 which connect the upper ends of the links 60 with the rear ends of the plates or lugs 62. Thus, as the tow bar 64 is pivoted downwardly about the pivot pins 70, the abutment surface 68 will force the lockpin 38 rearwardly into locking engagement with the lugs 50 which are disposed so that the tow bar 64 will effectively be locked from pivotal movement about the vertical axis of the bolt 20 and the steerable wheels will also be locked with the steerable wheels and tow bar disposed in straight ahead condition. The weight of the tow bar 64 when disconnected from a towing vehicle is sufficient to cause the tow bar 64 to assume the downwardly inclined position illustrated in FIG. 2 for actuating the locking pin into locked position. As illustrated, the links 60 are relatively short and one end of each link is pivotally attached to the tow bar 64 by the pivot pins 70 and the other end of each link is pivotally attached to the adapter or bracket 26 by the pivot bolt or pin 56.

Also attached to the pivot pins 70 at the inner ends thereof is a pair of links 72 which extend rearwardly normally in substantially parallel relation to the top plate 32. Disposed intermediate the links 72 at the rear ends thereof is a plate 74 having a cylindrical member 76 rigid with the rear edge thereof. The cylindrical member 76 receives a pivot bolt 78 therethrough which also extends through the rear ends of the links 72 thus connecting the plate 74 with the links 72 which are relatively longer than the links 60 and which extend normally to a position generally above the upper end of the pivot bolt 20.

Bonded to the undersurface of the plate 74 is a block or body of rubber or equivalent resilient material 80. The bottom surface of the block 80 is bonded to a plate 82 that is fixedly mounted on the top plate 32 as by the use of suitable bolts or the like to enable detachment of the plate 82 in relation to the top plate 32 for replacement of the block 80. The plates 74 and 82 with the block of rubber or resilient material 80 bonded therebetween forms a shear mount for the tow bar 64 with the links 60 serving as a limit control for the relative movement between the plates 74 and 82 during transmission of forces between the plates 74 and 82.

FIG. 3 illustrates the relaxed position of the shear mount with the links 60 disposed substantially perpendicularly to the plate 32 and the links 72 and no forces being transmitted from the tow bar to the axle 12. FIG. 4 illustrates the condition of the shear mount when a towing force is being exerted by the tow bar 64. When forward pulling force is exerted on the tow bar 64, the pivot pin 70 will be moved forwardly thus inclining the links 60 forwardly and at the same time, the links 72 will be moved forwardly thus moving the plate 74 forwardly and the upper portion of the block 80 forwardly thus causing shear forces in the resilient block 80 which cushions the forces exerted by the tow bar 64 and isolates or cushions shock forces from being transmitted from the tow bar to the axle 12. As illustrated, the tension force exerted by the tow bar 64 will revolve into components of force exerted on the links 72 and the links 60. As the towing or pulling force increases, the degree of deflection of the block 80 will increase and at the same time, the links 60 will assume a more forward position thus approaching a straight line condition so that the vector of the force transmitted through the links 60 to the axle 12 will be increased and the vector of the force transmitted through the shear mount will decrease. As this condition approaches, of course, the resistance force of the shear mount has reached substantially its maximum thus the shear mount resistance or rubber resistance increases as the straight line condition of the links 60 and the tow bar 64 is approached. This particular assembly of links assures maximum use of the shear mount by employing its maximum resistance to shear but at the same time reduces the possibility of rupture of the shear mount inasmuch as movement of the upper plate 74 of the shear mount is limited by the links 60 inasmuch as the links 60 will preclude movement of the top plate 74 beyond the point of failure of the rubber shear block 80.

When a pushing force is exerted on the tow bar 64 as shown in FIG. 2, the plate 74 is moved rearwardly in relation to the plate 82 thus placing the shear block 80 in shear in the opposite direction. Hereagain, the links 60 approach a straight line condition and limit the degree of movement of the upper plate 74 of the shear mount.

In the event the shear mount becomes ruptured which may possibly occur for various reasons, the connection between the axle 12 and the tow bar 64 would normally have a limited degree of unrestrained movement inasmuch as the links 60 would be capable of freely pivoting about pivot pin 56. In order to preclude this and to enable the tow bar to be effectively employed, the bottom plate 28 is provided with a pair of depending apertured lugs 84 which will receive a pin or bolt therethrough when the links 72 are disconnected from the pivot bolt 78 extending through the sleeve or cylinder 76 and connected to the lugs 84. The bolt 78 may be removed in a rapid manner and the same bolt or a similar bolt or pin may be employed to then secure the links 72 to the lugs 84 thus retaining the links 60 as well as the links 72 in the dotted line position illustrated in FIG. 3 so that the tow bar 64 will then be connected to the adapter or bracket 26 to transit force through the pivot pins 70, the links 60 and the links 72. This enables the connection between the tow bar 74 and the axle 12 to be rendered operative and such connection will not have freedom of movement other than about pivot pin 70 and about pivot pin 20. Thus, even though the shock mount may rupture during a towing operation, the connection may be maintained effective by merely disconnecting the rear ends of the links 72 from their normal position on the shock mount and reconnecting them to the lugs 84 provided therefor.

Lubrication fittings, bearings or bushings, spacers and retainer fasteners or pins may be provided where deemed appropriate. The shock mounting may be detachably connected to the plate 32 and to the sleeve 76 to facilitate replacement thereof as may become necessary.

The shock mounted tow bar may be employed wherever it is desired to transmit force from one vehicle or load carrying unit to another vehicle or load carrying unit with the assembly illustrated being especially adapted for use in combination with a demountable running gear having steerable wheels controlled by the tow bar or tongue.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A tow bar assembly for connecting a towing vehicle to a towed vehicle comprising a tow bar adapted to be connected at its forward end to a towing vehicle, adapter means adapted to connect the tow bar to a towed vehicle, and a linkage assembly pivotally interconnecting the tow bar and adapter means for pivotal movement of the tow bar about a transverse horizontal axis, said linkage assembly including means cushioning transmission of forces between the tow bar and adapter means, said adapter means including an elongated plate member, pivot means supporting said plate member for pivotal movement about a vertical axis, said plate member extending forwardly and rearwardly of said pivot means, the rear portion of the plate member adapted to be connected with a steering mechanism on the towed vehicle, and lock means mounted on the elongated plate member for actuation in response to pivotal movement of the tow bar to a downwardly inclined position for locking the elongated plate member in relation to the pivot means whereby the lock means is adapted to lock the steering mechanism of the towed vehicle.

2. The structure as defined in claim 1 wherein said lock means includes an elongated lockpin reciprocally mounted on said adapter means and including a forward end projecting forwardly therefrom, said tow bar including an abutment means engageable with the forward end of the lockpin for moving it rearwardly when the tow bar is pivoted to a downwardly inclined position, and stationary lugs engageable by the rear end of the lockpin when moved rearwardly in relation to the adapter means for locking the adapter means against pivotal movement about a vertical axis, and spring means biasing said lockpin forwardly to an unlocked position.

3. A tow bar assembly for connecting a towing vehicle to a towed vehicle comprising a tow bar adapted to be connected at its forward end to a towing vehicle, adapter means adapted to connect the tow bar to a towed vehicle, and a linkage assembly pivotally interconnecting the tow bar and adapter means for pivotal movement of the tow bar about a transverse horizontal axis, said linkage assembly including means cushioning transmission of forces between the tow bar and adapter means, said linkage assembly including a pair of relatively short links pivotally interconnecting the forward end of the adapter means and the rear end of the tow bar, a pair of elongated links connected to the pivotal connection between the pair of short links and the tow bar and extending rearwardly in overlying relation to the adapter means, said cushioning means including a shock mount disposed between the rear ends of the pair of rearwardly extending elongated links and the adapter means, said adapter means including a generally horizontal plate member, a plate connected with the elognated links and disposed in overlying relation to the plate member, a block of resilient material disposed between the plate and plate member with the upper and lower surfaces secured thereto respectively whereby draft forces exerted on the tow bar will exert shear forces on said block.

4. The structure as defined in claim 3 wherein said short links are normally disposed vertically when the shear mount is relaxed, said pair of rearwardly extending elongated links being disposed substantially horizontally when the shear mount is relaxed, said links and the pivotal connection therebetween being moved forwardly upon exertion of a pulling force on the tow bar thus moving the short links towards a straight line condition with the connection with the adapter means for limiting the relative movement of the shear mount and progressively transmitting a greater proportion of the force directly to the adapter means as the shear mount approaches the limit of its movement.

5. The structure as defined in claim 3 together with pivot means supporting said plate member for pivotal movement about a vertical axis, said plate member extending forwardly and rearwardly of said pivot means with the rear portion of the plate member adapted to be connected with a steering mechanism on the towed vehicle, and lock means mounted on the plate member for actuation in response to pivotal movement of the tow bar to a downwardly inclined position for locking the plate member in relation to the pivot means whereby the lock means is adapted to lock the steering mechanism of the towed vehicle.

6. An assembly for interconnecting a pair of movable units for transmitting forces therebetween comprising a bar adapted to be connected with one of the units, a plate adapted to be connected to the other unit, and linkage means connected with said bar and plate for transmitting forces therebetween, said linkage means including means cushioning at least a portion of the force being transmitted, said cushioning means including a resilient block, the lower surface of the block being secured to said plate, a plate member secured to the upper surface of said block, said plate and plate member being generally horizontal and vertically disposed, said linkage means including a pair of links normally oriented in angular position with the juncture between the links being connected with the bar, the other end of one of the links being connected with said plate, the other end of the other of said links being connected to the plate member for transferring a force thereto to move it in parallel relation to the plate thereby introducing a shear force in the block as the links are moved toward a position in which the bar becomes aligned with the link connected with said plate.

7. The structure as defined in claim 6 wherein said plate is supported for pivotal movement about a vertical axis to cushion the force transmitted at various angular positions of the bar about a vertical axis.

8. The structure as defined in claim 6 wherein said link connected with said plate is substantially vertically disposed when no force is being transmitted and relatively short in length as compared with the link connected with the plate member for pivotal movement toward alignment thereto when force is being exerted thereon by the bar.

References Cited

UNITED STATES PATENTS

| 1,574,469 | 2/1926 | Clement | 280—445 |
| 1,743,119 | 1/1930 | Cowell | 267—1 X |
| 1,752,638 | 4/1930 | Johnson | 280—486 X |
| 1,866,796 | 7/1932 | Breuss | 280—103 |
| 2,513,932 | 7/1950 | Grube | 280—485 |
| 3,399,907 | 9/1968 | Hein | 267—1 X |

LEO FRIAGLIA, Primary Examiner

U.S. Cl. X.R.

280—103